United States Patent
Rosillo et al.

(10) Patent No.: US 8,371,905 B1
(45) Date of Patent: Feb. 12, 2013

(54) MAGNETICALLY ATTACHED SPECTACLE LENS WITH HIDDEN MAGNETS AND METHOD

(75) Inventors: Roberto Rosillo, Van Nuys, CA (US); Roxanne Gonzalez, Van Nuys, CA (US); Stephen Kurtin, Sherman Oaks, CA (US)

(73) Assignee: Zoom Focus Eyewear, LLC, Van Nuys, CA (US)

( * ) Notice: Subject to any disclaimer, the term of this patent is extended or adjusted under 35 U.S.C. 154(b) by 146 days.

(21) Appl. No.: 12/932,841

(22) Filed: Mar. 8, 2011

Related U.S. Application Data

(60) Provisional application No. 61/339,952, filed on Mar. 10, 2010.

(51) Int. Cl.
*B24B 1/00* (2006.01)

(52) U.S. Cl. ............................................. 451/43; 451/42

(58) Field of Classification Search .................... 351/47, 351/57, 83, 86, 103, 106, 159.73, 159.75, 351/41; 451/42, 43; 264/239, 250, 260
See application file for complete search history.

(56) References Cited

U.S. PATENT DOCUMENTS

| | | | | |
|---|---|---|---|---|
| 6,267,651 | B1 * | 7/2001 | Kordonski et al. | 451/113 |
| 6,293,671 | B1 * | 9/2001 | Masunaga | 351/47 |
| 6,478,420 | B2 * | 11/2002 | Xiang | 351/47 |
| 7,241,007 | B2 * | 7/2007 | Cody | 351/86 |
| 7,600,870 | B2 * | 10/2009 | Zelazowski | 351/47 |
| 7,850,301 | B2 * | 12/2010 | DiChiara | 351/106 |

* cited by examiner

*Primary Examiner* — Hung Dang
(74) *Attorney, Agent, or Firm* — Saul Epstein

(57) ABSTRACT

A magnetically attached spectacle lens wherein magnets are embedded in the rear surface of the lens in a circumferential groove near the periphery of the lens. The magnets are spaced around the periphery of the lens, and are held in the groove by preferably a wicked in cyanoacrylate adhesive. The spaces between the magnets are preferably filled with a light activated potting compound. Prior to installation of the magnets, the inside of the groove is painted, preferably by spraying, with an opaque paint whereby the magnets are hidden from the view of onlookers. During fabrication, after magnet installation, any overspray from the painting step is removed by using a solvent preferably applied by moistened swabs or cloth.

11 Claims, 2 Drawing Sheets

MAGNETICALLY ATTACHED SPECTACLE LENS WITH HIDDEN MAGNETS AND METHOD

RELATED APPLICATION

This application claims the benefit under 35 USC §119(e) of the filing date of U.S. Provisional Patent Application No. 61/339,952 entitled "Magnetically Attached Spectacle Lens", filed Mar. 10, 2010.

BACKGROUND OF THE INVENTION

Variable focus spectacles that include magnetically attached lenses have been described in U.S. Pat. No. 7,866,816 by one of the present inventors. The disclosures therein are relevant hereto and are therefore included here by reference as though set out at length.

SUMMARY OF THE INVENTION

This invention concerns a lens that is magnetically attachable to variable focus spectacles including magnets which, when the lens is attached as intended, are not visible to onlookers and a method for fabricating said lens.

DETAILED DESCRIPTION OF THE INVENTION

Figure 1:
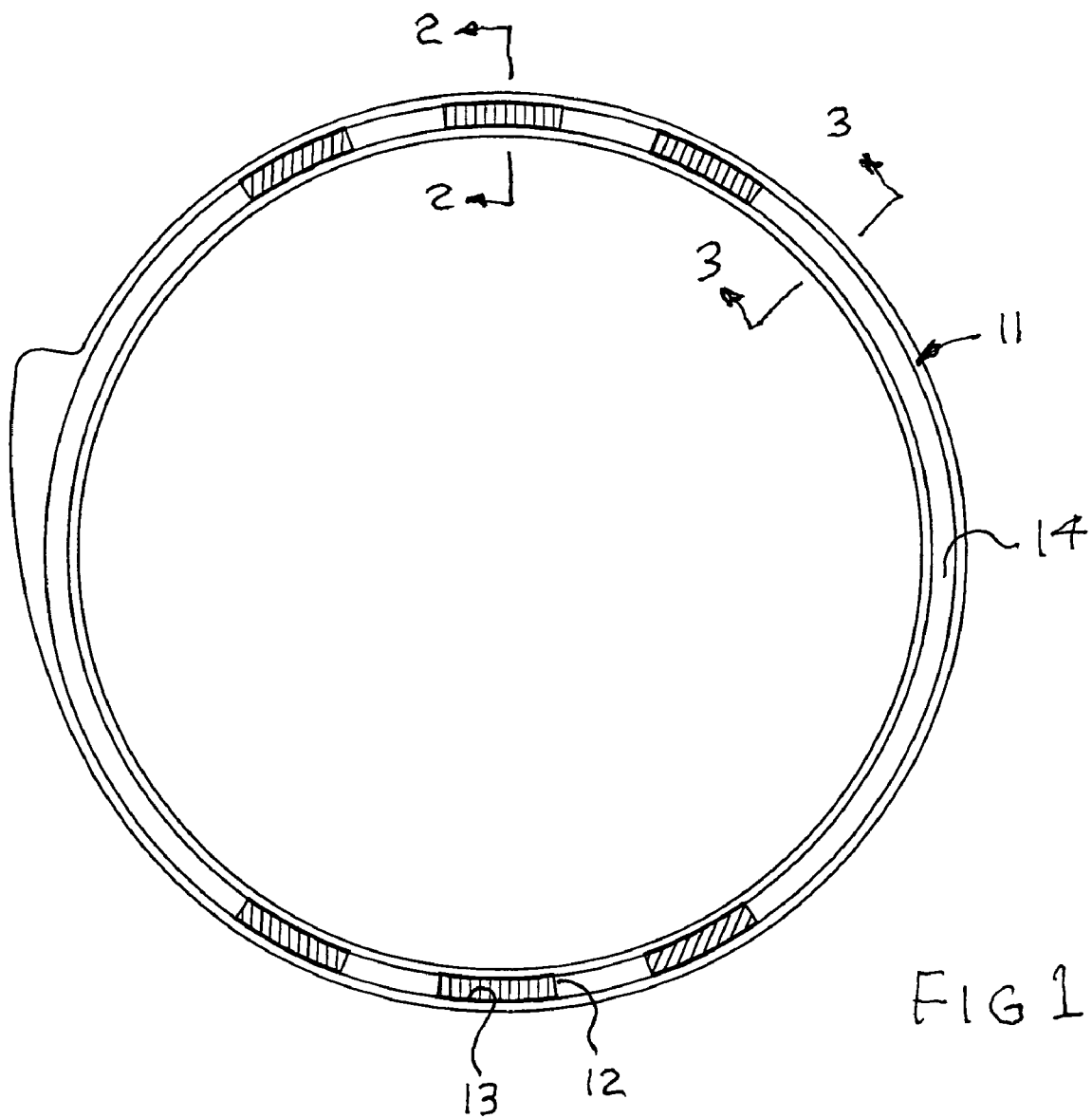
FIG. 1 is a rear view of a spectacle lens according to the invention.
Figure 3:
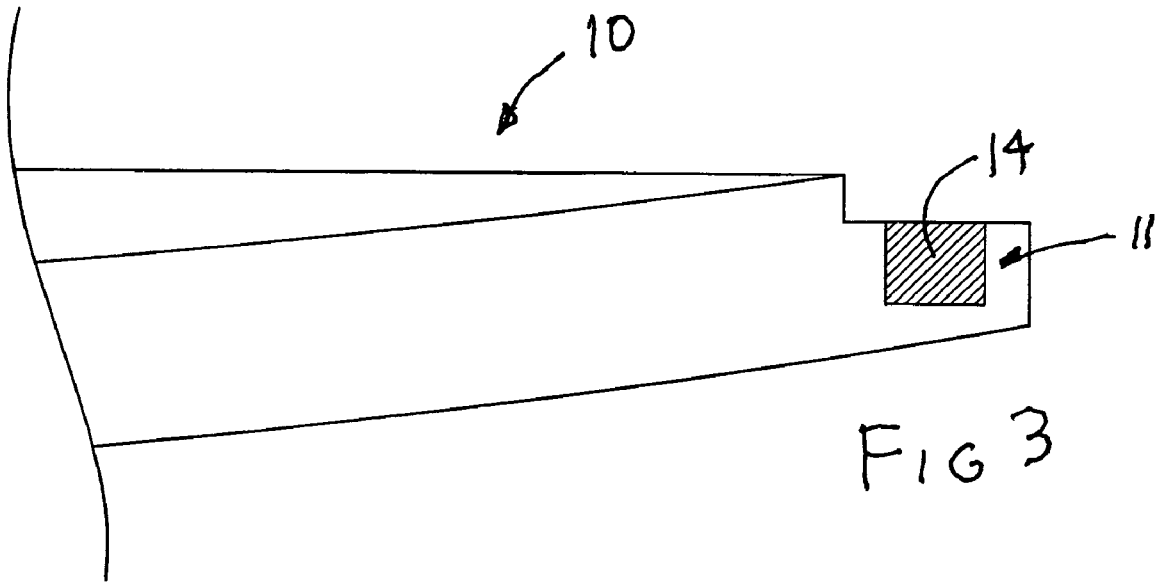
FIG. 3 is a fragmentary sectional view of the lens shown in FIG. 1, taken at 3-3 of FIG. 1, a view not including a magnet section.
Figure 2:
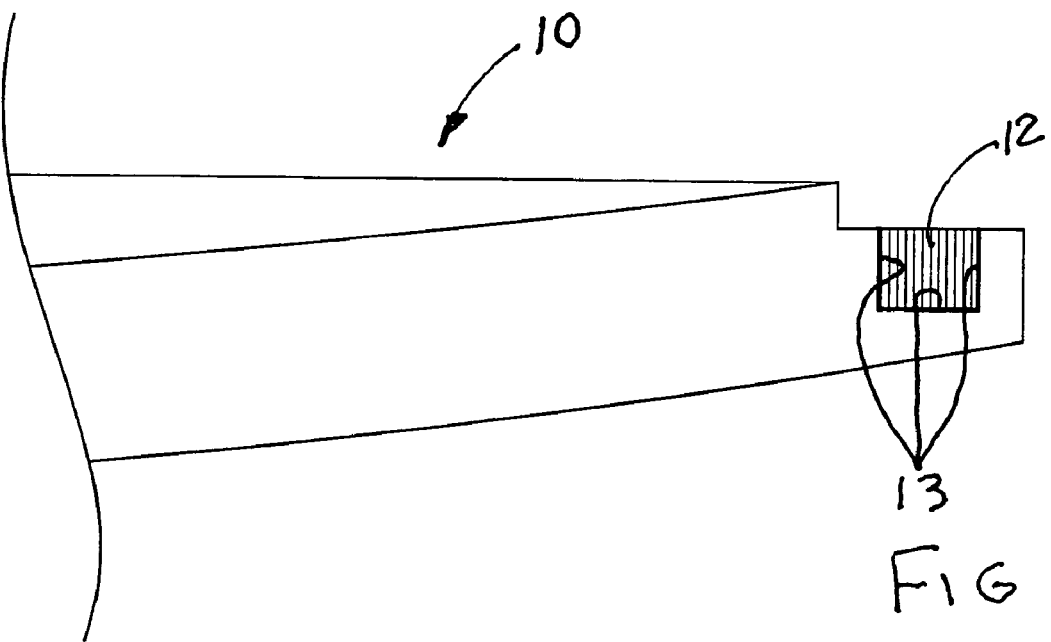
FIG. 2 is a fragmentary sectional view of the lens shown in FIG. 1, taken at 2-2 of FIG. 1, a view including a magnet section.

FIG. 1 is a rear view of a lens according to the invention. That is, it is a view showing the surface of the lens that faces the spectacles to which the lens is intended to be attached. The figure shows a lens 10 having a groove 11 in its as-edged rear surface near the periphery of the lens. A plurality of magnets 12 are shown set into the groove, spaced around the periphery, preferably near the top and bottom of the lens.

For cosmetic purposes, it is preferred that the groove has a uniform appearance when viewed from the front, and that the magnets be hidden from onlookers. This is accomplished in the present invention by painting the inside surface of the groove before installing the magnets (using an opaque paint), thus rendering items in the groove invisible to onlookers. The paint in the groove is not numbered in the figures. The inside of the groove may be painted with, for example, one or more coats of a paint that is soluble in a suitable solvent, such as alcohol. The term "soluble" is used herein to describe a paint that is removable from a surface after the paint has dried, by using a solvent. It is preferred that the painting be done in several thin coats of a semi-transparent metal colored acrylic paint, preferably applied by airbrush, followed by an opaque coat also sprayed on. Alternately, a single coat of suitable paint may also be used, if desired. Tamiya acrylic paints have been found to be particularly suitable. These paints dry rapidly, and the dried film is soluble in alcohol. No masking of the lens during the painting step is contemplated. Consequently, overspray from the airbrush will create undesired painted areas outside the groove. Care to avoid such overspray areas is not necessary, since, according to the present invention, the groove ultimately becomes self-masked, following which overspray is removed as described below.

After the groove has been painted, the magnets can be installed. After being properly positioned, each of a plurality of magnets 12 is held in the groove by a suitable adhesive 13, such as a wicking grade cyanoacrylate adhesive. The magnets are preferably disposed near the top and bottom of the lens (as illustrated). The magnets are preferably sized a few thousandths of an inch narrower than the painted groove (preferably about 0.001" to about 0.005" narrower, and more preferably about 0.001" to about 0.002" narrower) so that capillarity will draw the adhesive into the gap between them and the groove.

After magnet installation is complete, the regions of the groove between the magnets are filled with preferably a transparent, and consequently easily cured, photo-activatable potting compound or filler 14. A transparent filler can be used because the inner surface of the groove has been painted, hence the filler is hidden from onlookers and need not be colored to hide the magnets. The filler is cured by exposing it to an appropriate dose of light. After the cure step, overspray from the painting step can be removed, preferably using alcohol or other suitable solvent, applied with cotton swabs or a moistened cloth. The cured filler acts as a mask during the cleanup step, protecting the paint in the groove. Also, the use of light curing filler avoids the use of heat, which could affect the lens and/or any optical coatings that may have been applied.

We claim:

1. A method for hiding magnets embedded in a spectacle lens comprising:
   providing a spectacle lens having a rear surface;
   cutting a groove in said rear surface near the periphery of said lens;
   painting at least the interior of said groove with a soluble paint and allowing said paint to dry;
   providing a plurality of magnets and positioning them in said groove;
   introducing an adhesive into the gaps between said magnets and the walls of said groove;
   curing said adhesive;
   filling the regions of said groove between said magnets with a clear photo-activatable potting compound;
   exposing said photo-activatable potting compound to a light source until cured; and
   removing any exposed paint on the surface of said spectacle lens by applying a solvent.

2. A method for hiding magnets embedded in a spectacle lens as recited in claim 1 wherein said soluble paint is soluble in alcohol, and said solvent is alcohol.

3. A method for hiding magnets embedded in a spectacle lens as recited in claim 1 wherein said paint is an acrylic paint and said solvent is alcohol.

4. A method for hiding magnets embedded in a spectacle lens as recited in claim 1 wherein said paint is applied by spraying.

5. A method for hiding magnets embedded in a spectacle lens as recited in claim 1 wherein said magnets are narrower than said groove by between about 0.001 inch and about 0.002 inch.

6. A method for hiding magnets embedded in a spectacle lens as recited in claim 1 wherein said magnets are narrower than said groove by between about 0.001 inch and about 0.005 inch.

7. A method for hiding magnets embedded in a spectacle lens as recited in claim 1 wherein said adhesive is a wicking grade cyanoacrylate.

8. A spectacle lens comprising:
a lens having a predetermined periphery and a rear surface;
a groove in said rear surface near the periphery of said lens;
a film of opaque paint covering the surface of said groove;
a plurality of magnets positioned in said groove;
a film of adhesive in the gaps between said magnets and said paint; and
clear filler filling the spaces in said groove between said magnets.

9. A spectacle lens as recited in claim 8 wherein said adhesive is a wicking grade of cyanoacrylate.

10. A spectacle lens as recited in claim 8 wherein said clear filler is photo-activated.

11. A spectacle lens as recited in claim 8 wherein said opaque paint is an acrylic paint.

* * * * *